United States Patent
Cho et al.

(10) Patent No.: US 11,978,876 B2
(45) Date of Patent: May 7, 2024

(54) BATTERY MODULE INCLUDING HEAT DISSIPATION MEMBER AND METHOD OF MANUFACTURING THE HEAT DISSIPATION MEMBER

(71) Applicant: LG ENERGY SOLUTION, LTD., Seoul (KR)

(72) Inventors: Young Bum Cho, Daejeon (KR); Eun Gyu Shin, Daejeon (KR); Jae Min Yoo, Daejeon (KR); Seung Joon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 146 days.

(21) Appl. No.: 17/639,193

(22) PCT Filed: Dec. 2, 2020

(86) PCT No.: PCT/KR2020/017427
§ 371 (c)(1),
(2) Date: Feb. 28, 2022

(87) PCT Pub. No.: WO2022/004972
PCT Pub. Date: Jan. 6, 2022

(65) Prior Publication Data
US 2022/0328906 A1    Oct. 13, 2022

(30) Foreign Application Priority Data
Jun. 29, 2020 (KR) .................. 10-2020-0079312

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/647* (2015.04); *H01M 10/6551* (2015.04); *H01M 50/211* (2021.01)

(58) Field of Classification Search
CPC ........... H01M 10/6568; H01M 10/613; H01M 10/647; H01M 10/6551; H01M 50/211;
(Continued)

(56) References Cited

U.S. PATENT DOCUMENTS

2011/0189511 A1   8/2011  Yoon
2013/0011701 A1   1/2013  Petzinger
(Continued)

FOREIGN PATENT DOCUMENTS

CN   106654417 A   5/2017
CN   106816668 A   6/2017
(Continued)

OTHER PUBLICATIONS

International Search Report for PCT/KR2020/017427 dated Mar. 25, 2021.
(Continued)

*Primary Examiner* — Muhammad S Siddiquee
(74) *Attorney, Agent, or Firm* — Birch, Stewart, Kolasch & Birch, LLP (57) ABSTRACT

A battery module includes a battery cell stack constituted by a plurality of stacked pouch-shaped battery cells, a battery module housing configured to receive the battery cell stack, and a heat dissipation member coupled to a portion of the battery module housing, wherein the heat dissipation member has a through-hole formed in a heat dissipation plate disposed so as to face the battery cell stack and a sealing member is added to the through-hole, and a method of manufacturing the heat dissipation member. It is possible to effectively prevent thermal runaway of a battery cell that has (Continued)

caught fire while minimizing an increase in volume of the battery module.

17 Claims, 10 Drawing Sheets

(51) Int. Cl.
*H01M 10/647* (2014.01)
*H01M 10/6551* (2014.01)
*H01M 50/211* (2021.01)

(58) Field of Classification Search
CPC ......... H01M 10/6556; H01M 10/6567; H01M 10/052; H01M 10/058; H01M 10/6554; H01M 50/244; H01M 2220/10; H01M 2220/20; H01M 2220/30; H01M 50/24; H01M 2200/10; Y02E 60/10; Y02P 70/50; A62C 3/16; B29C 45/14008
See application file for complete search history.

(56) References Cited

U.S. PATENT DOCUMENTS

| | | |
|---|---|---|
| 2016/0118697 A1 | 4/2016 | Yoon |
| 2016/0315361 A1 | 10/2016 | Petzinger |
| 2019/0077276 A1* | 3/2019 | Capati ................ H05K 7/20872 |
| 2019/0305391 A1 | 10/2019 | Petzinger |
| 2021/0028517 A1* | 1/2021 | Choi ................... H01M 10/613 |
| 2021/0313633 A1 | 10/2021 | Petzinger |

FOREIGN PATENT DOCUMENTS

| | | |
|---|---|---|
| CN | 206650148 U | 11/2017 |
| CN | 110112507 A | 8/2019 |
| EP | 3 333 932 A1 | 6/2018 |
| JP | 2010-40420 A | 2/2010 |
| JP | 2014-523622 A | 9/2014 |
| JP | 2017-147128 A | 8/2017 |
| KR | 10-2011-0090236 A | 8/2011 |
| KR | 10-1451873 B1 | 10/2014 |
| KR | 10-2016-0113888 A | 10/2016 |
| KR | 10-1984817 B1 | 5/2019 |
| KR | 10-2019-0085005 A | 7/2019 |
| WO | WO 2021/004860 A1 | 1/2021 |

OTHER PUBLICATIONS

Extended European Search Report for European Application No. 20943108.9, dated Aug. 4, 2023.

* cited by examiner

BATTERY MODULE INCLUDING HEAT DISSIPATION MEMBER AND METHOD OF MANUFACTURING THE HEAT DISSIPATION MEMBER

TECHNICAL FIELD

This application claims the benefit of priority to Korean Patent Application No. 2020-0079312 filed on Jun. 29, 2020, the disclosure of which is hereby incorporated by reference herein its entirety.

The present invention relates to a battery module including a heat dissipation member and a method of manufacturing the heat dissipation member, and more particularly to a battery module including a heat dissipation member having a through-hole formed therein so as to prevent the occurrence of a thermal runaway phenomenon by directly injecting water into a battery cell that has caught fire and a method of manufacturing the heat dissipation member.

BACKGROUND ART

A lithium secondary battery, which is capable of being charged and discharged, is suitable to be used as a built-in battery cell, since it is unnecessary to replace the battery cell. Stability of the lithium secondary battery has been rapidly improved and capacity of the lithium secondary battery has also been rapidly increased. Consequently, the lithium secondary battery has been applied to various devices.

For example, the lithium secondary battery has been widely used not only as an energy source for a wireless mobile device, which is a small multifunctional product, or a wearable device configured to be put on the body but also as an energy source for electric vehicles and hybrid electric vehicles, which have been presented as alternatives to existing gasoline and diesel vehicles causing air pollution or as an energy storage system (ESS).

As the lithium secondary battery is used as a large-capacity, high-output energy source, as described above, it becomes very important to guarantee safety of the lithium secondary battery.

In the case in which fire breaks out in battery cells received in the energy storage system, a method of injecting water into a battery module or a battery pack using a separate injection device is generally used.

In this case, however, a facility and space necessary to provide the water injection device are needed, and fire may spread due to time difference between the point in time at which gas discharged due to venting of a battery cell is sensed and the point in time at which water injection is performed.

Alternatively, a method of preventing heat transfer between battery cells or cooling a battery cell that has caught fire using a structure in which a thermal insulation material or a fire-extinguishing agent is provided inside or outside the battery module or the battery pack may be used.

The above method may solve a problem in that the facility and space necessary to provide the separate water injection device are needed, but cost of the battery module or the battery pack is increased due to high price of the thermal insulation material or the fire-extinguishing agent. In addition, the volume of the battery module or the battery pack is increased due to addition of separate parts, whereby energy density is reduced. Furthermore, in the case in which the amount of the fire-extinguishing agent provided in the battery cell is too small to remove all of the thermal energy discharged from the battery cell, it is difficult to prevent the battery cell from catching fire.

In connection therewith, Patent Document 1 discloses an automatic fire-extinguishing device for energy storage systems, which includes a carbon dioxide supply unit including a carbon dioxide supply member in which high-pressure carbon dioxide is stored in a compressed state such that carbon dioxide is supplied into a fire-extinguishing line in a powerless fashion without application of separate power. In Patent Document 1, the constructions, such as the fire-extinguishing line and the carbon dioxide supply member, are separately needed, whereby a problem in that the size of an energy storage system is increased is not solved.

Patent Document 2 discloses a battery system including a reservoir configured to store a fire-extinguishing agent and a conduit means configured to guide the fire-extinguishing agent, wherein the conduit means is located so as to collide with a vent-gas jet discharged through a vent hole formed in any one of a plurality of battery cells and wherein the conduit means is configured to be melted by the vent-gas jet.

Since the battery system of Patent Document 2 includes the reservoir configured to store the fire-extinguishing agent and the conduit means configured to guide the fire-extinguishing agent, a problem in that the volume of the battery system is increased is still not solved.

Therefore, there is a high necessity for technology capable of preventing reduction in energy density while minimizing spread of flames in the case in which the large-capacity, high-output battery module or battery pack catches fire, as described above.

PRIOR ART DOCUMENTS (Patent Document 1) Korean Registered Patent Publication No. 1984817 (2019 May 27)
(Patent Document 2) Korean Patent Application Publication No. 2019-0085005 (2019 Jul. 17)

DISCLOSURE

Technical Problem

The present invention has been made in view of the above problems, and it is an object of the present invention to provide a battery module including a heat dissipation member having a structure in which a refrigerant for the heat dissipation member is directly injected to a battery cell that has caught fire such that, when a battery cell catches fire or explodes, thermal energy is prevented from being transferred to battery cells adjacent thereto and a method of manufacturing the heat dissipation member.

Technical Solution

In order to accomplish the above object, a battery module according to the present invention includes a battery cell stack comprising a plurality of stacked pouch-shaped battery cells, a battery module housing configured to receive the battery cell stack, and a heat dissipation member coupled to a portion of the battery module housing, wherein the heat dissipation member has at least one through-hole formed in a heat dissipation plate disposed so as to face the battery cell stack and a sealing member is sealing the at least one through-hole.

In the battery module according to the present invention, the battery module housing may include an upper plate and a lower plate, the heat dissipation member may include a heat dissipation plate and a refrigerant flow portion, and the refrigerant flow portion is defined between the upper plate and the heat dissipation plate.

In the battery module according to the present invention, the heat dissipation member may be configured such that the lower plate and the refrigerant flow portion is defined between the lower plate and the heat dissipation plate.

In the battery module according to the present invention, the sealing member may be made of a material that is melted above a predetermined temperature or sparks discharged from each of the pouch-shaped battery cells.

In addition, the through-hole may be opened by melting of the sealing member, and a refrigerant may be injected into the pouch-shaped battery cell through the at least one through-hole.

In the battery module according to the present invention, the refrigerant may be a coolant, and the coolant may include no combustible material.

In addition, each of the upper plate and the lower plate may be provided with a flow channel configured to guide the flow of the coolant.

In the battery module according to the present invention, the battery module housing may include an upper plate and a lower plate, the heat dissipation member may be a water tank that may be coupled to the inner surface of the upper plate, the water tank may have a first surface coupled to the inner surface of the upper plate and a second surface opposite the first surface and provided with the at least one through hole.

In the battery module according to the present invention, the battery module housing may include an upper plate and a lower plate, the heat dissipation member may be a water tank that may be coupled to an inner surface of the lower plate, the water tank may have a first surface thereof to the inner surface of the lower plate and a second surface opposite the first surface and provided with the at least one through hole.

In the battery module according to the present invention, even in the case in which any one of the pouch-shaped battery cells catches fire, the at least one through-hole may be formed at the position at which a coolant can be supplied to the pouch-shaped battery cell catching fire, and the number of the at least one through-hole may be set depending on the number and size of the pouch-shaped battery cells.

In the battery module according to the present invention, the sealing member may fill the at least one through-hole, and the sealing member may include an extension portion formed at the inner surface and the outer surface of the heat dissipation plate so as to further extend outwards from a circumference of the at least one through-hole.

In the battery module according to the present invention, a recess may be formed in the portion of each of the inner surface and the outer surface of the heat dissipation plate at which the extension portion is formed.

In addition, the heat dissipation plate having the recess formed therein may have at least one vertical section selected from the group consisting of a polygonal shape, a semicircular shape, and a semielliptical shape.

In addition, the present invention provides a method of manufacturing a heat dissipation member included in the battery module. Specifically, the method of manufacturing the heat dissipation member includes (a) disposing a flat plate for the heat dissipation plate of the heat dissipation member between a die and a holder, (b) punching the flat plate to form the at least one through-hole, thereby manufacturing a heat dissipation plate, (c) mounting the heat dissipation plate in a mold for insert extrusion molding, (d) fixing the heat dissipation plate to the mold and injecting a resin for the sealing member, and (e) removing the mold and collecting the heat dissipation plate having the sealing member added thereto, wherein a protrusion configured to form a recess in the heat dissipation plate is formed in each of the die and the holder.

In the method of manufacturing the heat dissipation member according to the present invention, the heat dissipation plate may be coupled to each of an upper plate and a lower plate of the battery module housing so as to be spaced apart therefrom, and a refrigerant flow portion configured to allow a refrigerant to be introduced thereinto and to be discharged therefrom may be defined in the space therebetween.

In the method of manufacturing the heat dissipation member according to the present invention, the heat dissipation plate may comprise a water tank coupled to each of the upper plate and the lower plate of the battery module housing, and the heat dissipation plate may be disposed at the other surface of the water tank that is opposite one surface of the water tank coupled to each of the upper plate and the lower plate.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention of the present application and the claims, singular forms are intended to include plural forms unless mentioned otherwise.

Also, in the description of the invention of the present application and the claims, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, embodiments of the present invention will be described in detail with reference to the accompanying drawings.

Figure 1:
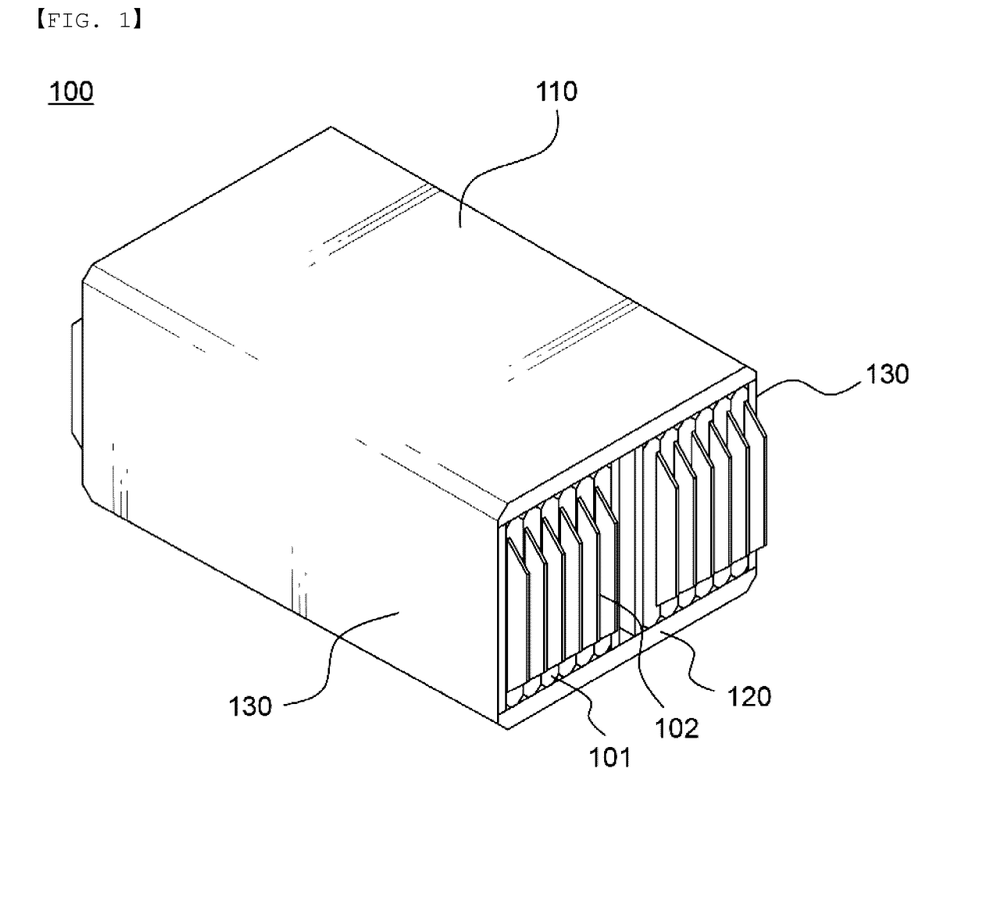
FIG. 1 is a perspective view of a battery module according to the present invention.

FIG. 1 is a perspective view of a battery module according to the present invention.

Referring to FIG. 1, the battery module 100 according to the present invention includes a battery module housing configured to receive therein a battery cell stack in which a plurality of pouch-shaped battery cells 101 is stacked and a heat dissipation member disposed at each of the upper surface and the lower surface of the battery cell stack.

As the plurality of pouch-shaped battery cells 101, bidirectional pouch-shaped battery cells 101, each of which has electrode leads 102 protruding in opposite directions, are shown in FIG. 1. Alternatively, unidirectional pouch-shaped battery cells, each of which has a positive electrode lead and a negative electrode lead protruding in the same direction, may be used.

The battery module housing includes an upper plate 110 disposed at the upper part of the battery cell stack, a lower plate 120 disposed at the lower part of the battery cell stack, and a side plate 130 disposed between the upper plate 110 and the lower plate 120, the side plate being disposed at the side of the battery cell stack.

In addition, outside the pouch-shaped battery cells 101 in a direction in which the electrode leads 102 of the pouch-shaped battery cells protrude, an end plate (not shown) may be coupled to the upper plate 110, the lower plate, and the side plate 130, whereby the battery module housing may be assembled.

In addition, the shape of the battery module housing is not limited to the structure shown in FIG. 1. Unlike what is shown in FIG. 1, a mono frame or a U frame may be used for the battery module housing.

Figure 2:
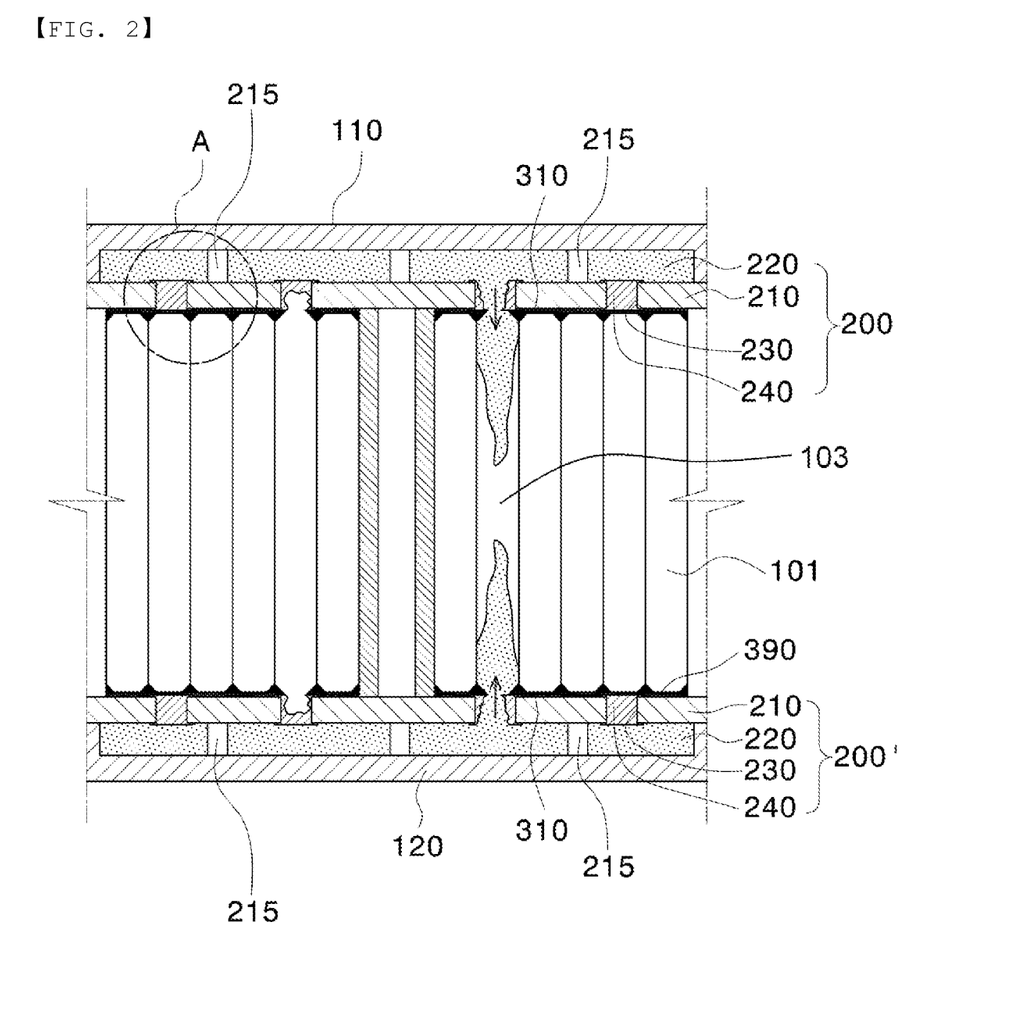
FIG. 2 is a vertical sectional view of a battery module according to an embodiment.

FIG. 2 is a vertical sectional view of a battery module according to an embodiment.

Referring to FIG. 2, in the battery module, a battery cell stack in which a plurality of pouch-shaped battery cells 101 is stacked is received in a battery module housing including an upper plate 110 and a lower plate 120.

A heat dissipation member 200 includes a heat dissipation plate 210 and a refrigerant flow portion 220 configured to allow a refrigerant to be introduced thereinto, to flow therein, and to be discharged therefrom. The heat dissipation plate 210 is coupled to the upper plate 110 so as to be spaced apart from the upper plate, and the refrigerant flow portion 220 is defined in the space between the heat dissipation plate and the upper plate. Consequently, the upper plate 110, the heat dissipation plate 210, and the refrigerant flow portion 220 form an integrated structure.

That is, the heat dissipation member 200 is located at the upper part of the battery cell stack in a state of being coupled to the upper plate 110 so as to be integrated therewith.

In addition, a heat dissipation member 200' includes a heat dissipation plate 210 and a refrigerant flow portion 220 configured to allow a refrigerant to be introduced thereinto, to flow therein, and to be discharged therefrom. The heat dissipation plate 210 is coupled to the lower plate 120 so as to be spaced apart from the lower plate, and the refrigerant flow portion 220 is defined in the space between the heat dissipation plate and the lower plate. Consequently, the lower plate 120, the heat dissipation plate 210, and the refrigerant flow portion 220 form an integrated structure.

That is, the heat dissipation member 200' is located at the lower part of the battery cell stack in a state of being coupled to the lower plate 120 so as to be integrated therewith.

A through-hole 230 is formed in the heat dissipation plate 210, and a sealing member 240 is added to the through-hole 230. The sealing member 240 is made of a material that is melted by high-temperature gas or sparks discharged from the pouch-shaped battery cells 101. That is, in a normal state as in the pouch-shaped battery cell 101, the state in which the through-hole 230 is sealed by the sealing member 240 is maintained. When temperature is increased or fire breaks out as in the pouch-shaped battery cell 103, however, the sealing member 240 is melted, whereby the through-hole 230 is opened. The refrigerant from the refrigerant flow portion 220 is directly injected into the pouch-shaped battery cell 103 through the opened through-hole 230. As a result, the pouch-shaped battery cell that overheats or catches fire is rapidly cooled, whereby it is possible to rapidly prevent propagation of thermal runaway.

The sealing member is made of a material that is melted by high-temperature gas or sparks discharged due to venting of the pouch-shaped battery cell having increased temperature. A thermoplastic polymer resin having a melting point of about 200° C. or lower may be applied. For example, a material having a melting point between about 100° C. and about 200° C., such as polyethylene or polypropylene, may be used as the thermoplastic polymer resin.

Meanwhile, in the case in which a coolant is employed as the refrigerant, it is necessary to prevent the pouch-shaped battery cell from having increasing flames or exploding due to injection of the coolant in consideration of the fact that the coolant is directly injected to the pouch-shaped battery cell. Consequently, it is preferable for an additive included in the coolant to include no combustible material. Alternatively, in the case in which a combustible material is included in the coolant as the additive, the amount of the additive may be provided to such an extent that it is possible to prevent secondary explosion of the pouch-shaped battery cell and at the same time the additive is used as an antifreeze in order to prevent freezing of the coolant.

In a heat dissipation member according to the present invention, the heat dissipation member 200 and the heat dissipation member 200' of FIG. 2 are identical in construction to each other except that the heat dissipation member 200 is configured such that the heat dissipation plate and the upper plate are coupled to each other and the heat dissipation member 200' is configured such that the heat dissipation plate and the lower plate are coupled to each other. Consequently, a description will be given based on the heat dissipation member 200.

Figure 3:
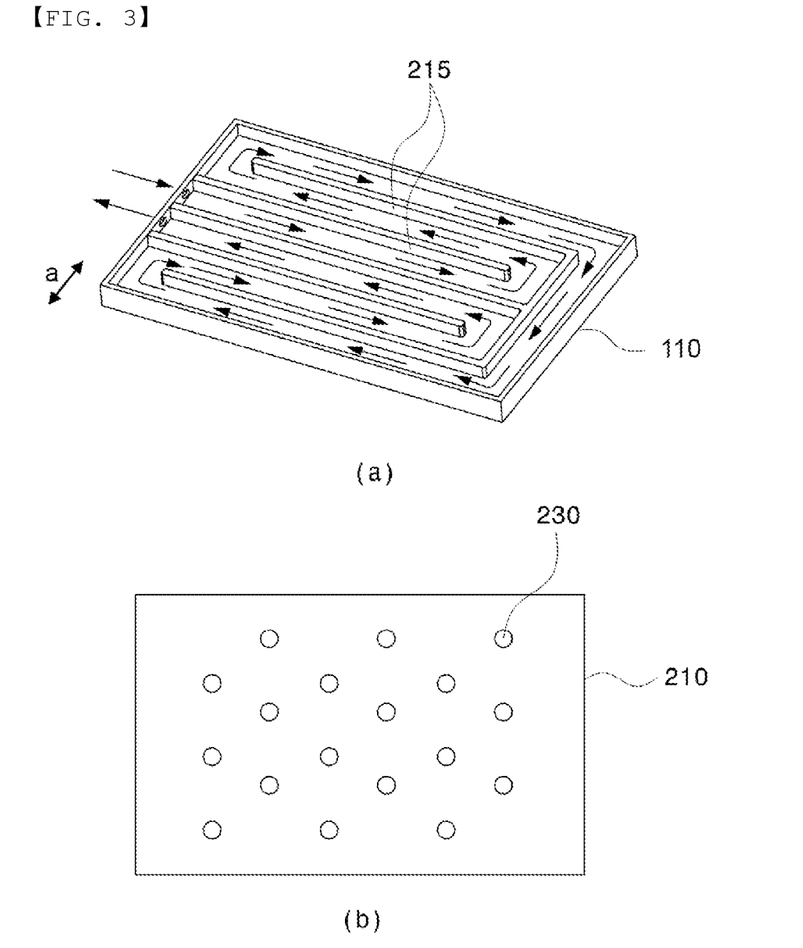
FIG. 3 is a perspective view and a plan view of a heat dissipation member according to the present invention in the state in which the heat dissipation member is exploded.

FIG. 3 is a perspective view and a plan view of the heat dissipation member according to the present invention in the state in which the heat dissipation member is exploded.

Referring to FIG. 3 together with FIG. 2, a perspective view of the heat dissipation member in the state in which the heat dissipation plate 210 is removed from the heat dissipation member is shown in FIG. 3(a) and a plan view of the heat dissipation plate 210 is shown in FIG. 3(b) in order to described the inner structure of the heat dissipation member in which the upper plate 110 and the heat dissipation plate 210 are coupled to each other.

The upper plate 110 is provided with partition walls 215 configured to guide the flow of the coolant used as the refrigerant, and a flow channel is defined between the partition walls 215.

The upper plate 110 is provided at the outer periphery of one side thereof with a coolant inlet and a coolant outlet formed so as to be adjacent to each other as indicated by arrows. The coolant inlet and a coolant outlet are formed in a middle portion of the outer periphery of one side of the upper plate in a lateral direction a thereof.

In this case, the temperature of the coolant introduced through the coolant inlet is the lowest and the temperature of the coolant discharged through the coolant outlet is the highest. As a result, the deviation in temperature of all of the coolant that flows in the refrigerant flow portion may be small. In the case in which the flow channel is formed as described above, therefore, the entire heat dissipation member may exhibit uniform heat dissipation efficiency.

FIG. 3(b) shows the state in which the through-hole 230 is formed in the heat dissipation plate 210.

Through-holes 230, each of which is circular in a plan view, are disposed in the heat dissipation plate 210 so as to be spaced apart from each other at uniform intervals in a horizontal direction and a vertical direction.

Even in the case in which any pouch-shaped battery cell catches fire, the through-hole must be formed at a position at which the coolant can be supplied to the pouch-shaped battery cell catching fire. That is, it is preferable for at least one through-hole to be disposed for each pouch-shaped battery cell such that the coolant can be supplied to all of the pouch-shaped battery cells. Consequently, the number and intervals of the through-holes may be adjusted depending on the number and size of the pouch-shaped battery cells.

Figure 4:
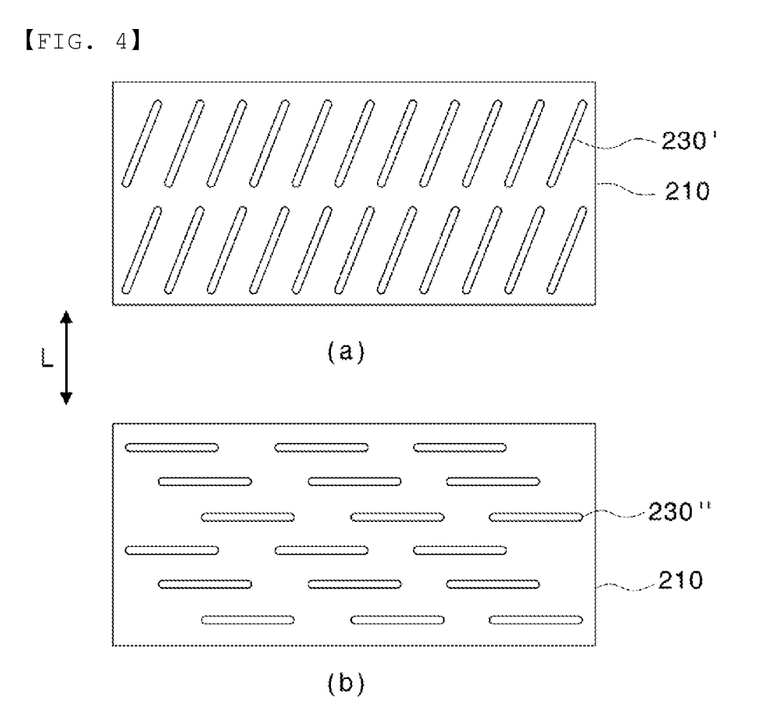
FIG. 4 is a plan view of a heat dissipation plate according to the present invention.

FIG. 4 is a plan view of a heat dissipation plate according to the present invention.

Referring to FIG. 4, through-holes 230' and 230" formed in the heat dissipation plate 210 are different in shape from the through-holes 230 of FIG. 3.

When battery cells are disposed such that a minor-axis direction of the heat dissipation plate 210 shown in FIG. 4 and a longitudinal direction L of each of the battery cells are parallel to each other, the through-holes 230' are formed obliquely such that one through-hole can cover two or more pouch-shaped battery cells, and the through-holes 230" are formed in a direction perpendicular to the longitudinal direction L of each of the battery cells such that one through-hole can cover two or more pouch-shaped battery cells.

In the case in which the through-holes are formed as described above, when the sealing member is melted by heat generated from any one of the pouch-shaped battery cells and explosion thereof, the through-hole is greatly formed, whereby the coolant may also be supplied to the surface of at least one battery cell that is located adjacent to the battery cell that has generated heat and exploded but has not generated heat and exploded. Consequently, it is possible to reduce the temperature of the battery cells that have not generated heat and exploded, and therefore it is possible to prevent the occurrence of a thermal runaway phenomenon.

Figure 5:
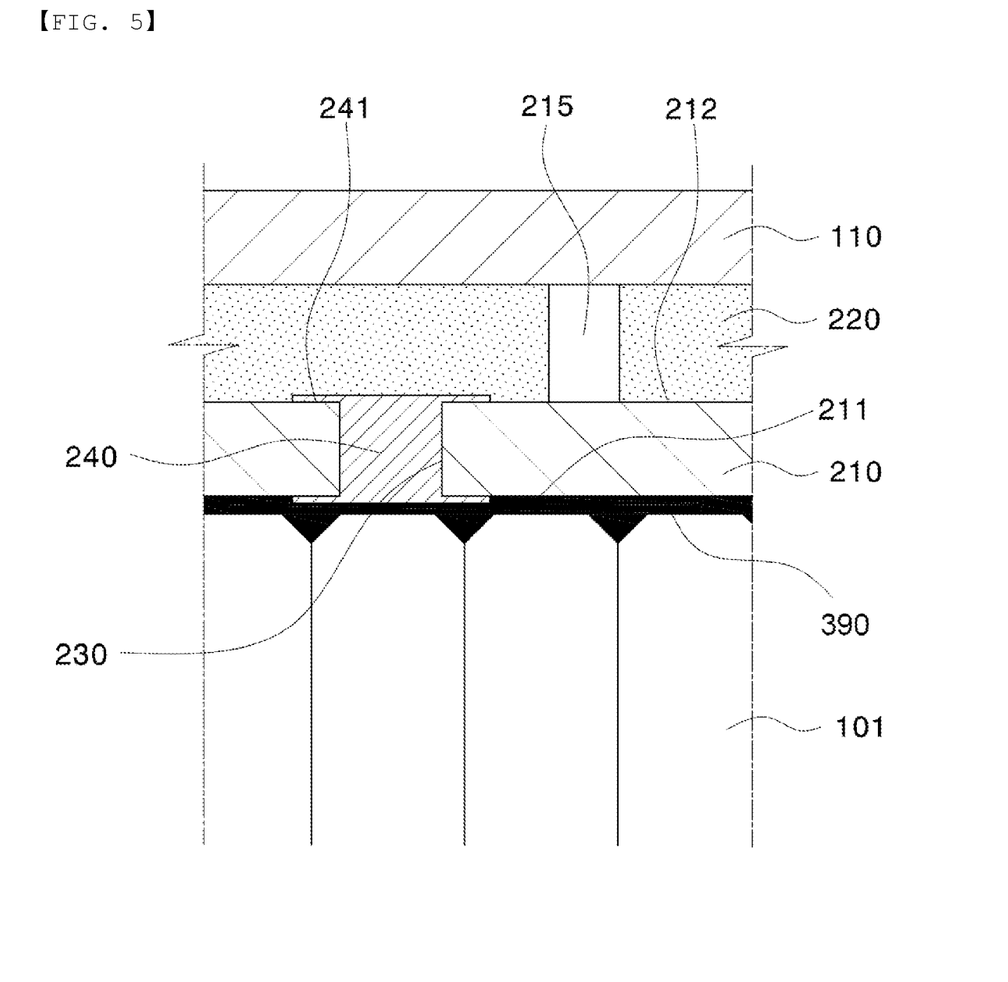
FIG. 5 is a partial enlarged view of FIG. 2.

FIG. 5 is a partial enlarged view of FIG. 2.

Referring to FIG. 5, the refrigerant flow portion 220 is formed between the heat dissipation plate 210 and the upper plate 110, and the partition wall 215 is formed in the refrigerant flow portion 220. The flow channel of the refrigerant is defined by the partition wall 215.

A space may be formed between the battery cell stack and the heat dissipation plate 210, and individual battery cells 101 may have different deviations in distance between the battery cells and the heat dissipation plate 210. Heat dissipation efficiency in which heat in the battery module is discharged out of the battery module is reduced by the space formed between the battery cell stack and the heat dissipation plate 210 as described above.

In order to prevent the occurrence of such a problem, the space between the battery cell stack and the heat dissipation plate 210 may be filled with a thermal interface material (TIM) 390.

Since the thermal interface material 390 increases thermal contact area between the battery cell stack and the heat dissipation plate, it is possible to rapidly discharge thermal energy generated in the battery cell stack out of the battery module.

In the case in which thermal energy discharged from the pouch-shaped battery cells does not come into direct contact with the sealing member due to the thermal interface material 390, however, the temperature of the sealing member may not reach a melting temperature. For this reason, addition of the thermal interface material may be omitted.

Alternatively, the thermal interface material may not be formed at the lower part of the through-hole of the heat dissipation plate but may be added to the remaining portion thereof. In this case, thermal energy of the vented battery cell may be directly transferred to the sealing member without loss even in the case in which the thermal interface material is added. As a result, the sealing member may be melted, and therefore the refrigerant may be supplied to the vented battery cell.

Meanwhile, the sealing member 240 is added to the through-hole 230, which is formed through the heat dissipation plate 210. For example, the sealing member 240 fills the through-hole 230, and includes an extension portion 241 formed at the inner surface 211 of the heat dissipation plate and the outer surface 212 of the heat dissipation plate so as to further extend outwards from the circumference of the through-hole 230.

Since the extension portion 241 is formed at the sealing member 240, it is possible to prevent the sealing member 240 from being removed by the pressure of the coolant flowing in the refrigerant flow portion, thereby preventing the through-hole from being opened.

Figure 6:
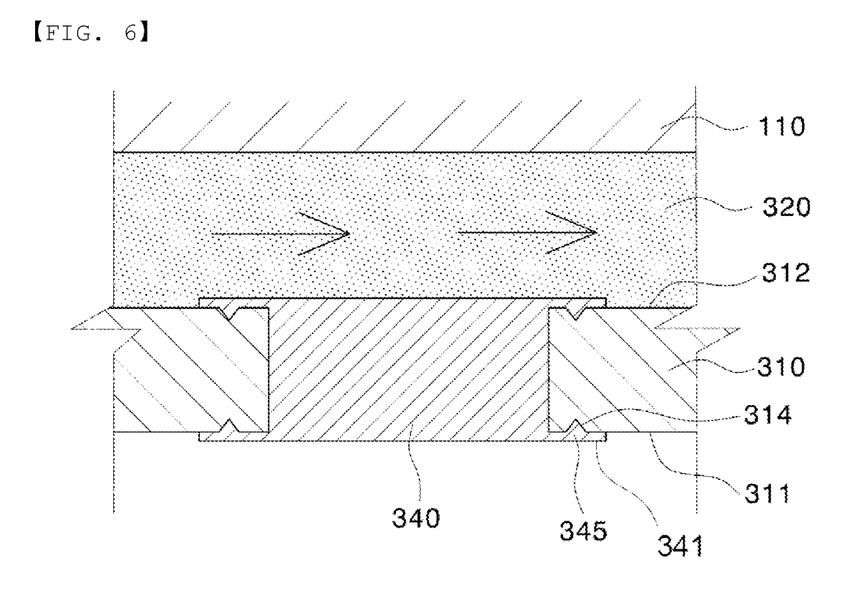
FIG. 6 is a vertical sectional enlarged view of a battery module in which a sealing member is added to a heat dissipation plate having a recess formed therein.

FIG. 6 is a vertical sectional enlarged view of a battery module in which a sealing member is added to a heat dissipation plate having a recess formed therein.

Referring to FIG. 6, a refrigerant flow portion 320 is formed between an upper plate 110 and a heat dissipation plate 310, and a sealing member 340 is added to a through hole formed in the heat dissipation plate 310.

The sealing member 340 includes an extension portion 341, and a recess 314 is formed in the portion of each of an inner surface 311 of the heat dissipation plate and an outer surface 312 of the heat dissipation plate at which the extension portion 341 is formed.

A portion of the sealing member constituting the extension portion 341 is inserted into the recess 314 to form an insertion portion 345. Consequently, it is possible to prevent the sealing member from being removed by the pressure of a coolant, thereby preventing the through-hole from being opened.

In order to manufacture the sealing member including the extension portion described above, an insert injection molding method of injecting a resin for the sealing member to the heat dissipation plate having the recess formed therein may be used. Alternatively, the portion of the sealing portion that fills the through-hole may be formed as a central portion of a sealing member having a shape and size corresponding to the shape and size of the through-hole, and a separate member may be added to the central portion of the sealing member to form an extension portion. At this time, the central portion of the sealing member and the separately added extension portion may be coupled to each other by adhesion using an adhesive material, screw engagement, or interference fitting. However, the coupling method is not restricted. In addition, the central portion of the sealing member may be made of a thermoplastic polymer resin that is melted at high temperature, and the separately added extension portion may be made of a material that is not melted at high temperature.

Figure 7:
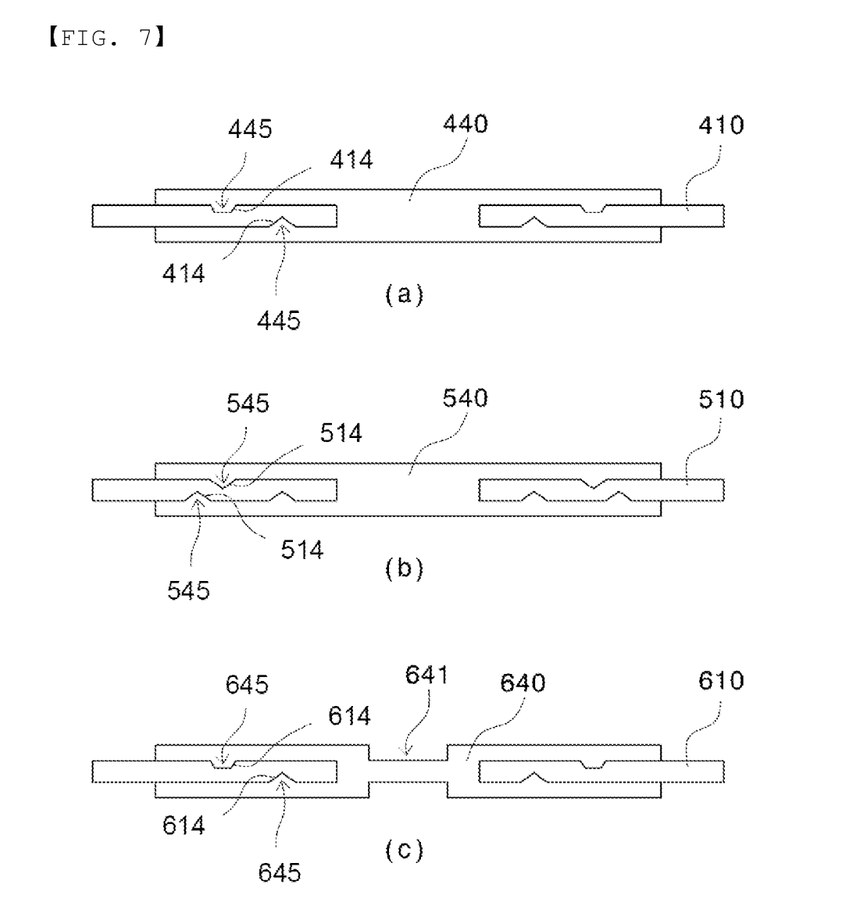
FIG. 7 is a vertical sectional view showing the state in which a sealing member is added to a heat dissipation plate having a recess formed therein.

FIG. 7 is a vertical sectional view showing the state in which a sealing member is added to a heat dissipation plate having a recess formed therein.

Referring to FIG. 7, each of sealing members 440, 540, and 640 is added to a corresponding one of heat dissipation plates 410, 510, and 610.

The portions of the heat dissipation plates 410, 510, and 610 that join extension portions are provided with recesses 414, 514, and 614, respectively, and insertion portions 445, 545, and 645 are formed in the recesses 414, 514, and 614, respectively.

The vertical section of each of the portions of the heat dissipation plates 410, 510, and 610 in which the recesses 414, 514, and 614 are formed, respectively, may be at least one selected from the group consisting of a polygonal shape, including a triangular shape and a trapezoidal shape, a semicircular shape, and a semielliptical shape or a combination thereof.

Referring to FIG. 7(*c*), the thickness of a central portion 641 of the sealing member 640 is formed so as to be less than the thickness of a central portion of the sealing member 440 and the thickness of a central portion of the sealing member 540. In the case in which the portion of the sealing member that seals a through-hole is formed so as to have a relatively small thickness, as described above, a time until the sealing member is melted and the through-hole is opened may be shortened, whereby it is possible to rapidly supply a refrigerant to a battery cell.

Figure 8:
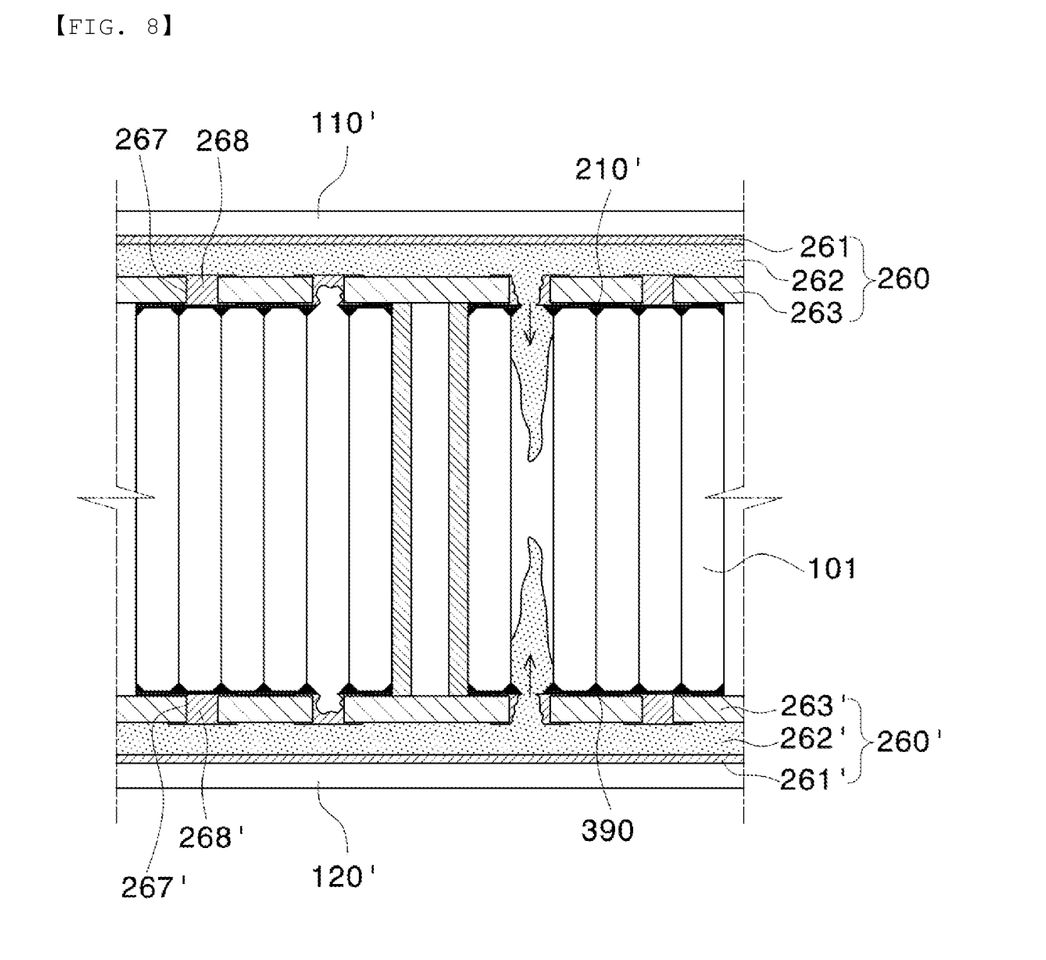
FIG. 8 is a vertical sectional view of a battery pack according to another embodiment.

FIG. 8 is a vertical sectional view of a battery pack according to another embodiment.

Referring to FIG. 8, a battery module housing includes an upper plate 110' and a lower plate 120', and a battery cell stack in which pouch-shaped battery cells 101 are arranged so as to be stacked is received in the battery module housing.

A water tank 260 configured to function as a heat dissipation member is coupled to the inner surface of the upper plate 110'. The water tank 260 includes a first surface 261 coupled to the inner surface of the upper plate 110' and a second surface 263 disposed so as to face the first surface 261, and a coolant 262 is received in a space defined between the first surface 261 and the second surface 263.

A through-hole 267 is formed in the second surface 263, and a sealing member 268 is added to the through-hole 267.

The sealing member 268 is made of a material that is melted by high-temperature gas or sparks discharged from the pouch-shaped battery cell 101 as the result of being opened. When the pouch-shaped battery cell is heated or catches fire, the sealing member 268 is melted, whereby the through-hole 267 is opened. As a result, the coolant 262 is directly injected into the pouch-shaped battery cell 101 that has caught fire. Consequently, it is possible to cool the pouch-shaped battery cell 101 that has caught fire and to extinguish the fire.

A water tank 260' includes a first surface 261' coupled to the inner surface of the lower plate 120' and a second surface 263' disposed so as to face the first surface 261', and a coolant 262' is received in a space defined between the first surface 261' and the second surface 263'.

A through-hole 267' is formed in the second surface 263', and a sealing member 268' is added to the through-hole 267'.

A description of the sealing member 268 is equally applicable to melting of the sealing member 268' due to venting or catching fire of the pouch-shaped battery cell 101 and effects resulting therefrom.

Figure 9:
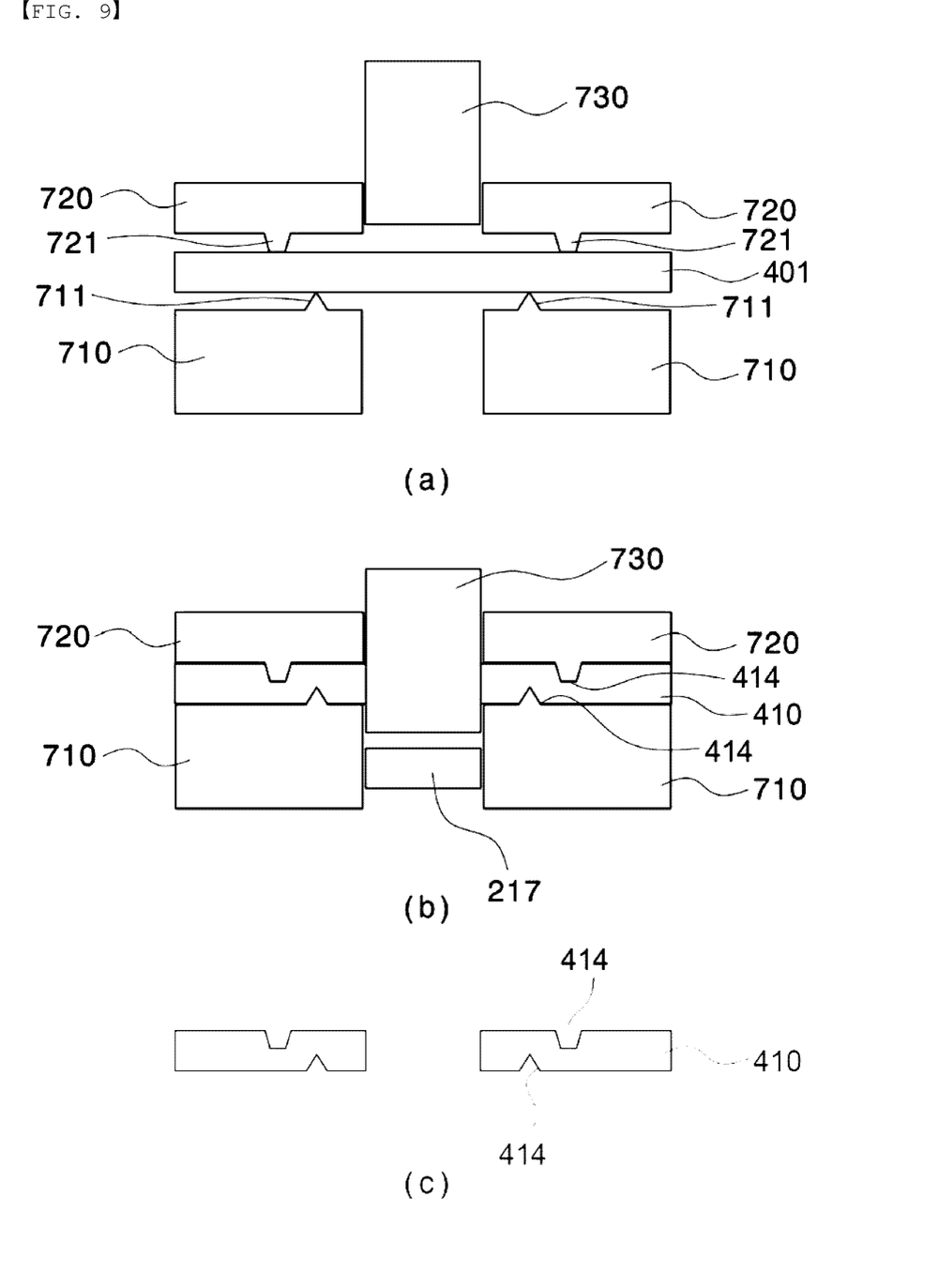
FIG. 9 is a front view schematically showing a heat dissipation plate manufacturing process.
Figure 10:
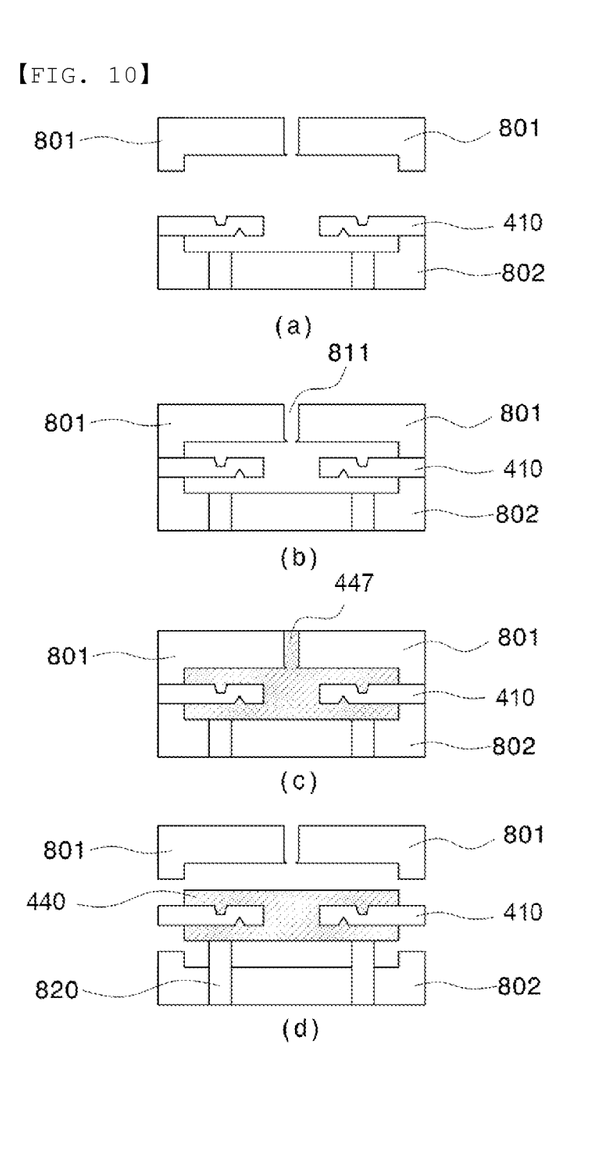
FIG. 10 is a front view schematically showing a process of adding a sealing member to a heat dissipation plate.

FIG. 9 is a front view schematically showing a heat dissipation plate manufacturing process, and FIG. is a front view schematically showing a process of adding a sealing member to a heat dissipation plate.

A method of manufacturing a heat dissipation member included in a battery module according to the present invention will be described with reference to FIGS. 9 and 10.

Specifically, the method of manufacturing the heat dissipation member includes (a) a step of disposing a flat plate for a heat dissipation plate of the heat dissipation member between a die and a holder, (b) a step of punching the flat plate using a punching machine to form a through-hole, thereby manufacturing a heat dissipation plate, (c) a step of mounting the heat dissipation plate in a mold for insert extrusion molding, (d) a step of fixing the heat dissipation plate to the mold and injecting a resin for a sealing member, and (e) a step of removing the mold and collecting a heat dissipation plate having a sealing member added thereto, wherein a protrusion configured to form a recess in the heat dissipation plate may be formed in each of the die and the holder.

In FIGS. 9 and 10, a process of manufacturing the heat dissipation plate 410 shown in FIG. 7(*a*) is shown. In the step of manufacturing the heat dissipation plate, a flat plate 401 for a heat dissipation plate of a heat dissipation member may be disposed between a die 710 and a holder 720, and a portion of the flat plate at which a through-hole is to be formed may be punched using a punching machine 730 in order to form the through-hole, whereby the heat dissipation plate 410 may be manufactured. A cut portion 217 formed as the result of cutting using the punching machine 730 is removed.

Protrusions 711 and 721 are formed on the die 710 and the holder 720, respectively, and recesses 414 having shapes and sizes corresponding to the shapes and sizes of the protrusions 711 and 721 are formed in the heat dissipation plate 410.

An insert extrusion molding method may be used as a method of forming a sealing member 440 at the heat dissipation plate 410. The heat dissipation plate 410 is disposed between an upper mold 801 and a lower mold 802. Subsequently, a resin 447 for a sealing member is injected through an injection port 811 formed in the upper mold 801. After the resin 447 for a sealing member is dried, a heat dissipation plate 410 having a sealing member 440 added thereto in the shape of an inner space formed between the upper mold 801 and the lower mold 802 is formed. A portion of the sealing member is inserted into the recesses 414 of the heat dissipation plate 410, whereby it is possible to stably fix the sealing member 440 to the heat dissipation plate 410.

The heat dissipation plate manufactured as described above is coupled to each of an upper plate and a lower plate of a battery module housing so as to be spaced apart therefrom, whereby it is possible to manufacture a heat dissipation member having a structure in which a refrigerant is introduced into and discharged from the space.

In addition, the heat dissipation plate may constitute a water tank coupled to each of the upper plate and the lower plate of the battery module housing, and the heat dissipation plate may be disposed at the other surface of the water tank that is opposite one surface of the water tank coupled to each of the upper plate and the lower plate.

In the case in which the battery module according to the present invention and the method of manufacturing the heat dissipation member included in the battery module are used, as described above, it is possible to rapidly cool a battery call that has caught fire, whereby it is possible to provide a battery module with improved safety.

Those skilled in the art to which the present invention pertains will appreciate that various applications and modifications are possible within the category of the present invention based on the above description.

DESCRIPTION OF REFERENCE SYMBOLS

100: Battery module
101, 103: Pouch-shaped battery cells
102: Electrode lead
110, 110': Upper plates
120, 120': Lower plates
130: Side plate
200, 200': Heat dissipation members
210, 310, 410, 510, 610: Heat dissipation plates
211, 311: Inner surfaces of heat dissipation plates
212, 312: Outer surfaces of heat dissipation plates
215: Partition wall
217: Cut portion
220, 320: Refrigerant flow portions
230, 230', 230", 267, 267': Through-holes
240, 268, 268', 340, 440, 540, 640: Sealing members
241, 341: Extension portions
260, 260': Water tanks
261, 261': First surfaces
262, 262': Coolants
263, 263': Second surfaces
314, 414, 514, 614: Recesses
345, 445, 545, 645: Insertion portions
390: Thermal interface material
401: Flat plate for heat dissipation plate
447: Resin for sealing member
641: Central portion of sealing member
710: Die
720: Holder
730: Punching machine
711, 721: Protrusions
801: Upper mold
802: Lower mold
811: Injection port
a: Lateral direction of upper plate
L: Longitudinal direction of battery cell

INDUSTRIAL APPLICABILITY

As is apparent from the above description, a battery module according to the present invention is configured such that the structure of a conventional heat dissipation member is changed without the addition of a separate additional construction in order to rapidly cool a battery cell that has caught fire, whereby it is possible to reliably inhibit a thermal runaway phenomenon of the battery cell while minimizing an increase in volume of the battery module.

Also, in the case in which a sealing member added to the heat dissipation member is melted by high temperature of the battery cell, a refrigerant is directly injected into the battery cell through the heat dissipation member, whereby it is possible to rapidly reduce the temperature of the battery cell.

In addition, a through-hole is formed in the heat dissipation member, and the sealing member is added to the through-hole to seal the through-hole, whereby it is possible to minimize an increase in weight of the battery module in spite of the addition of a fire-extinguishing structure.

In addition, even in the case in which any one of battery cells constituting a battery cell stack is vented, a heat dissipation member configured to allow a refrigerant to be injected into the battery cell is used, whereby it is also possible to obtain a thermal diffusion blocking effect for a large-capacity battery module.

In addition, water is injected into a battery cell instead of an expensive fire-extinguishing agent, whereby it is possible to reduce production cost.

The invention claimed is:

1. A battery module comprising:
a battery cell stack comprising a plurality of stacked battery cells;
a battery module housing configured to receive the battery cell stack; and
at least one heat dissipation member coupled to a portion of the battery module housing,
wherein the at least one heat dissipation member has at least one through-hole formed in a heat dissipation plate disposed so as to face the battery cell stack,
wherein a sealing member seals the at least one through-hole, and
wherein the through-hole is formed obliquely or perpendicular to a longitudinal direction of each of the plurality of battery cells such that one through-hole can cover two or more of the plurality of battery cells.

2. The battery module according to claim 1, wherein the battery module housing comprises an upper plate and a lower plate,
wherein the at least one heat dissipation member comprises a first heat dissipation plate and a first coolant flow portion, and
wherein the first coolant flow portion is defined between the upper plate and the first heat dissipation plate.

3. The battery module according to claim 2, wherein the at least one heat dissipation member comprises a second heat dissipation plate and a second coolant flow portion, and
wherein the second coolant flow portion is defined between the lower plate and the second heat dissipation plate.

4. The battery module according to claim 1, wherein the sealing member is made of a material that is melted above a predetermined temperature or sparks discharged from the battery cells.

5. The battery module according to claim 4, wherein the through-hole is opened by melting of the sealing member, and
wherein a coolant is injected into the pouch shaped battery cell through the at least one through-hole.

6. The battery module according to claim 5,
wherein the coolant comprises no combustible material.

7. The battery module according to claim 6, wherein each of the upper plate and the lower plate is provided with a flow channel configured to guide a flow of the coolant.

8. The battery module according to claim 1, wherein the battery module housing comprises an upper plate and a lower plate,
wherein the at least one heat dissipation member comprises a water tank coupled to an inner surface of the upper plate,
wherein the water tank comprises a first surface coupled to the inner surface of the upper plate and a second surface opposite the first surface and provided with the at least one through hole.

9. The battery module according to claim 1, wherein the battery module housing comprises an upper plate and a lower plate,
wherein the at least one heat dissipation member comprises a water tank coupled to an inner surface of the lower plate,
wherein the water tank comprises a first surface coupled to the inner surface of the lower plate and a second surface opposite the first surface and provided with the at least one through hole.

10. The battery module according to claim 1, wherein even in a case in which any one of the battery cells catches fire, the at least one through-hole is formed at a position at which a coolant can be supplied to the battery cell catching fire, and
wherein a number of the at least one through-hole is set depending on a number and size of the battery cells.

11. The battery module according to claim 1, wherein the sealing member fills the at least one through-hole, and
wherein the sealing member comprises an extension portion formed at an inner surface and an outer surface of the heat dissipation plate so as to further extend outwards from a circumference of the at least one through-hole.

12. The battery module according to claim 11, wherein a recess is formed in a portion of each of the inner surface and the outer surface of the heat dissipation plate at which the extension portion is formed.

13. The battery module according to claim 12, wherein the heat dissipation plate having the recess formed therein has at least one vertical section selected from the group consisting of a polygonal shape, a semicircular shape, and a semielliptical shape.

14. A method of manufacturing a heat dissipation member included in the battery module according to claim 1, the method comprising:
(a) disposing a flat plate for the heat dissipation plate of the at least one heat dissipation member between a die and a holder;
(b) punching the flat plate to form the at least one through-hole, thereby manufacturing a heat dissipation plate;
(c) mounting the heat dissipation plate in a mold for insert extrusion molding;
(d) fixing the heat dissipation plate to the mold and injecting a resin for the sealing member; and
(e) removing the mold and collecting the heat dissipation plate having the sealing member added thereto,
wherein a protrusion configured to form a recess in the heat dissipation plate is formed in each of the die and the holder.

15. The method according to claim 14, wherein the heat dissipation plate is coupled to each of an upper plate and a lower plate of the battery module housing so as to be spaced apart therefrom, and
wherein a coolant flow portion configured to allow a coolant to be introduced thereinto and to be discharged therefrom is defined in the space therebetween.

16. The method according to claim 14, wherein the heat dissipation plate comprises a water tank coupled to each of an upper plate and a lower plate of the battery module housing, and
wherein the heat dissipation plate is disposed at the other surface of the water tank that is opposite one surface of the water tank coupled to each of the upper plate and the lower plate.

17. The battery module according to claim 3, wherein the first coolant flow portion and the second coolant flow portion are in fluid communication with the battery cell stack by the at least one through-hole.

* * * * *